(12) United States Patent
Vecchione et al.

(10) Patent No.: US 12,017,426 B2
(45) Date of Patent: Jun. 25, 2024

(54) PROCESSING METHOD FOR INSERTING ELECTRONIC DEVICES THAT ARE SUITABLE FOR COMMUNICATING IN RADIO FREQUENCY INTO RESPECTIVE RUBBER SLEEVES

(71) Applicant: BRIDGESTONE EUROPE NV/SA [BE/BE], Zaventem (BE)

(72) Inventors: Ciro Vecchione, Rome (IT); Alfonso Di Egidio, Rome (IT)

(73) Assignee: Bridgestone Europe NV/SA [BE/BE], Zaventem (BE)

( * ) Notice: Subject to any disclaimer, the term of this patent is extended or adjusted under 35 U.S.C. 154(b) by 416 days.

(21) Appl. No.: 17/604,730

(22) PCT Filed: Apr. 30, 2020

(86) PCT No.: PCT/IB2020/054095
§ 371 (c)(1),
(2) Date: Oct. 18, 2021

(87) PCT Pub. No.: WO2020/225668
PCT Pub. Date: Nov. 12, 2020

(65) Prior Publication Data
US 2022/0203638 A1 Jun. 30, 2022

(30) Foreign Application Priority Data

May 3, 2019 (IT) .................. 102019000006513

(51) Int. Cl.
*B29D 30/00* (2006.01)
*G06K 19/077* (2006.01)
(52) U.S. Cl.
CPC ... *B29D 30/0061* (2013.01); *G06K 19/07764* (2013.01); *B29D 2030/0083* (2013.01)

(58) Field of Classification Search
None
See application file for complete search history.

(56) References Cited

U.S. PATENT DOCUMENTS 4,910,864 A * 3/1990 Elliott ............... H05K 13/043
294/2
2009/0126861 A1 5/2009 Chen
(Continued)

FOREIGN PATENT DOCUMENTS

| EP | 2172878 A2 | 4/2010 |
| EP | 3385886 A1 | 10/2018 |
| JP | 2003196631 A | 7/2003 |

OTHER PUBLICATIONS

International Search Report: International Search Report for corresponding international application No. PCT/IB2020/054095 dated Oct. 7, 2020, 5 pages.

*Primary Examiner* — Jacob T Minskey
*Assistant Examiner* — Adrianna N Konves
(74) *Attorney, Agent, or Firm* — Patterson Intellectual Property Law, P.C.

(57) ABSTRACT

Processing method for inserting electronic devices that are suitable for communicating in radio frequency into respective rubber sleeves (5); are provided: a conveyor (9) for advancing a first rubber belt (10) arranged along an insertion path; a first feed device (12) for placing the transponder (1) upon an upper surface of the first rubber belt (10); a second feed device (13) for placing upon the upper surface of the first rubber belt (10) and upon each previously placed transponder (1) a corresponding sheet of green rubber (14) that completely covers the transponder (1); and a cutting device (16) arranged downstream of the second feed device (13) along the direction of travel of the first rubber belt (10) for cutting out at least the first rubber belt (10) by perform- (Continued)

ing a cut of a rectangular shape around each transponder (1) in order to separate each sleeve (5) from the rubber belt.

22 Claims, 4 Drawing Sheets

(56) References Cited

U.S. PATENT DOCUMENTS

2010/0051701 A1 3/2010 Ogata
2011/0284155 A1 11/2011 Sevaille et al.

\* cited by examiner

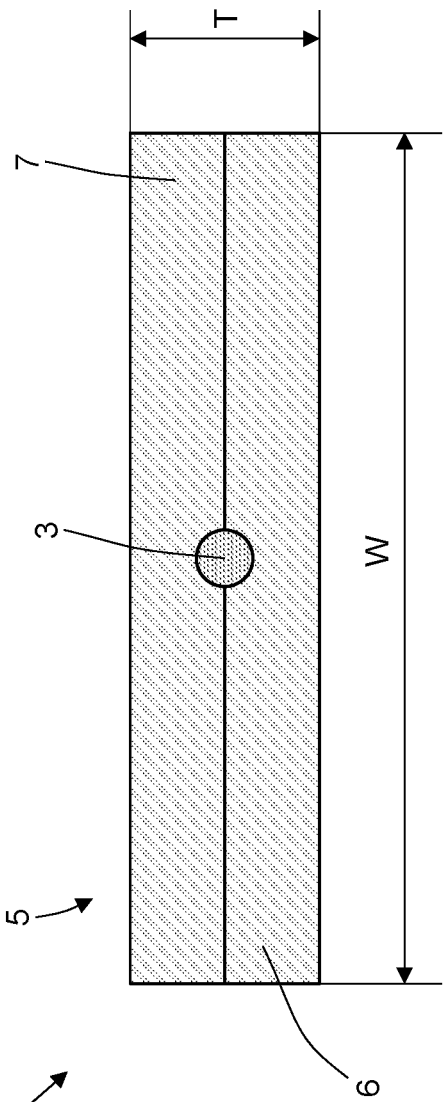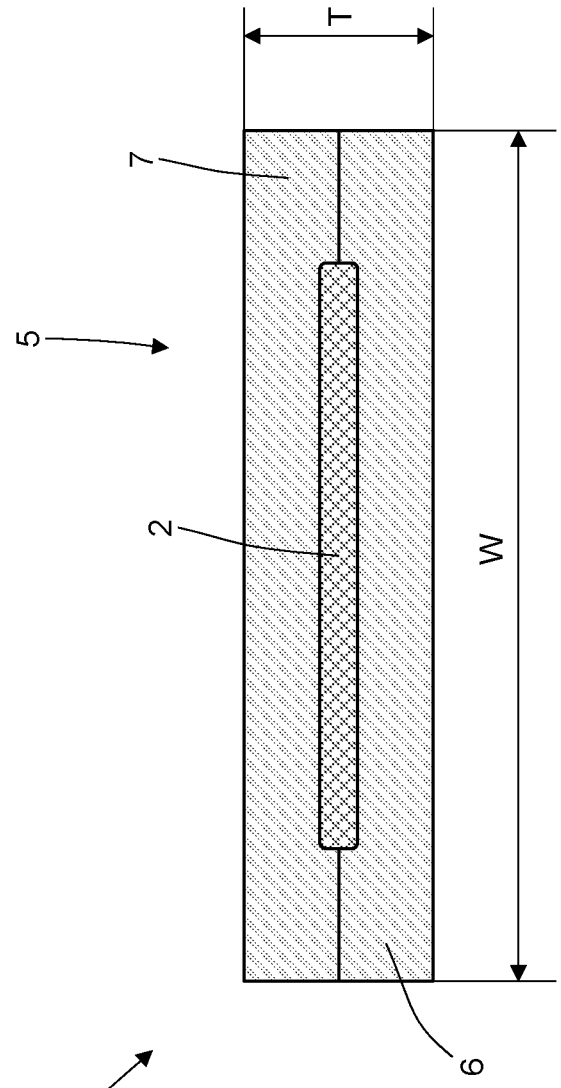

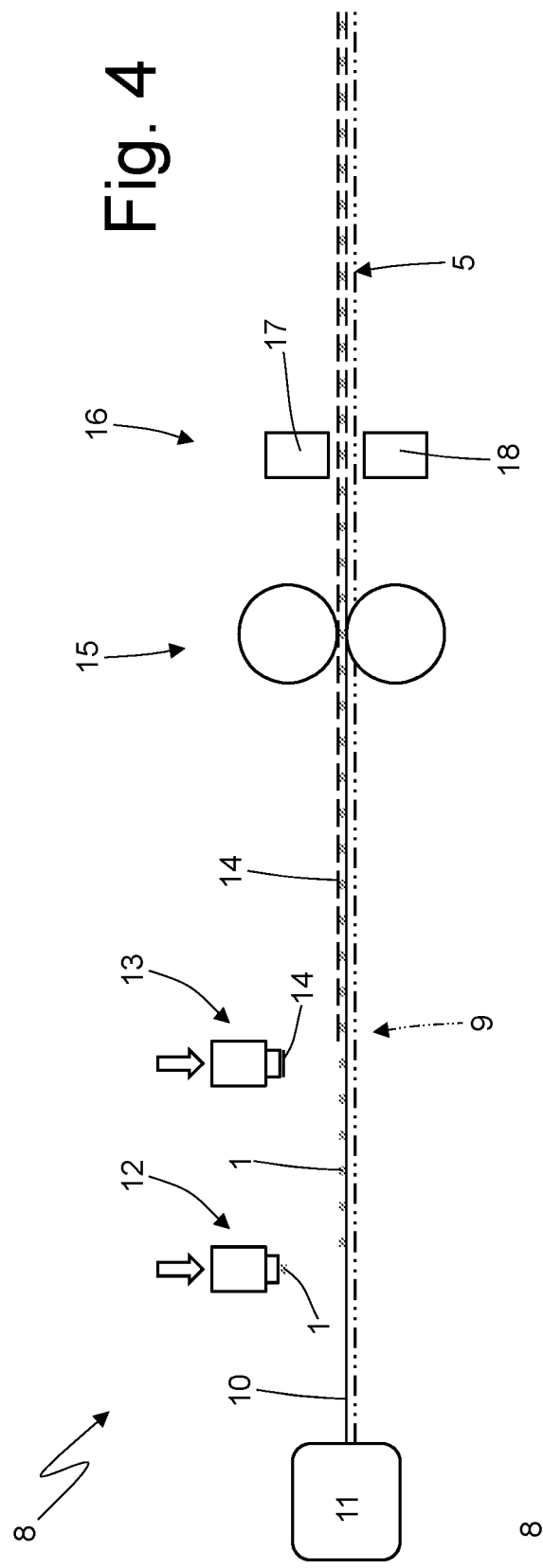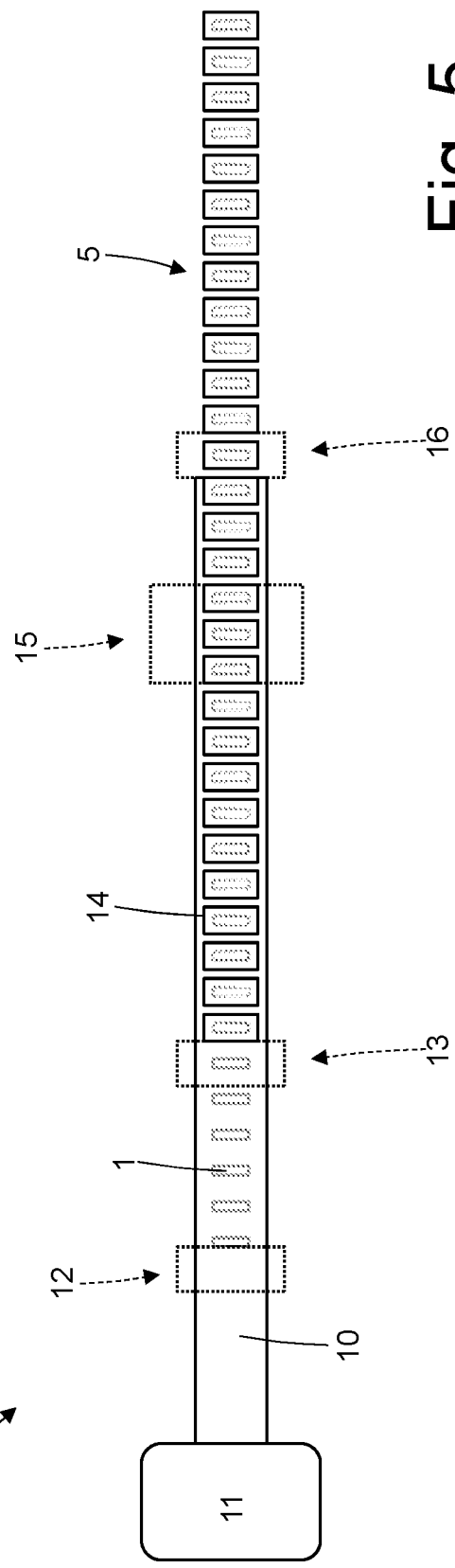

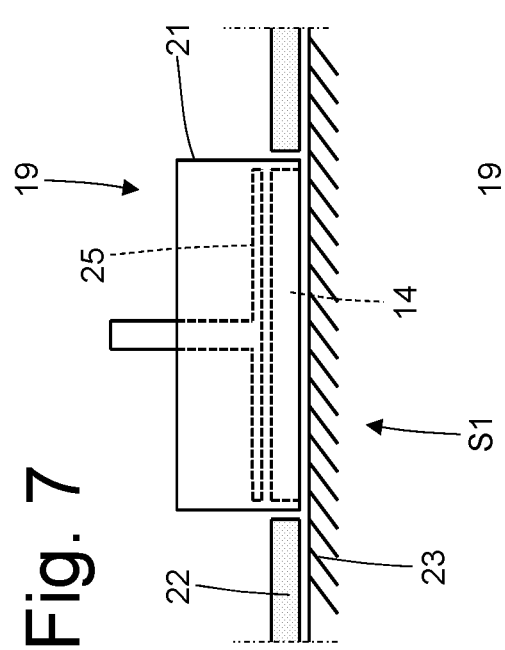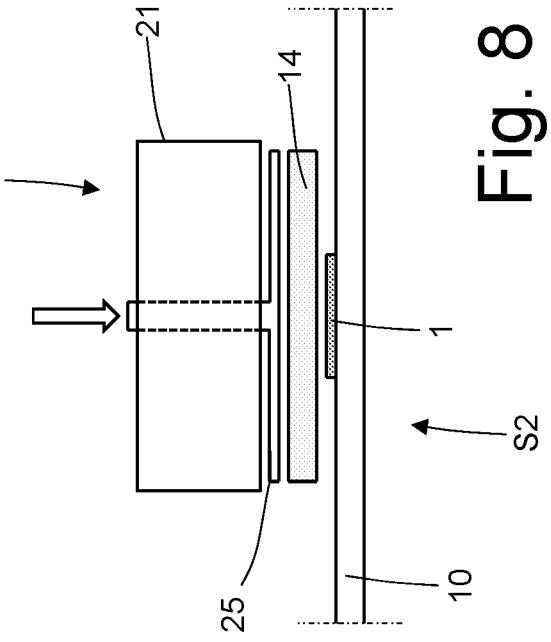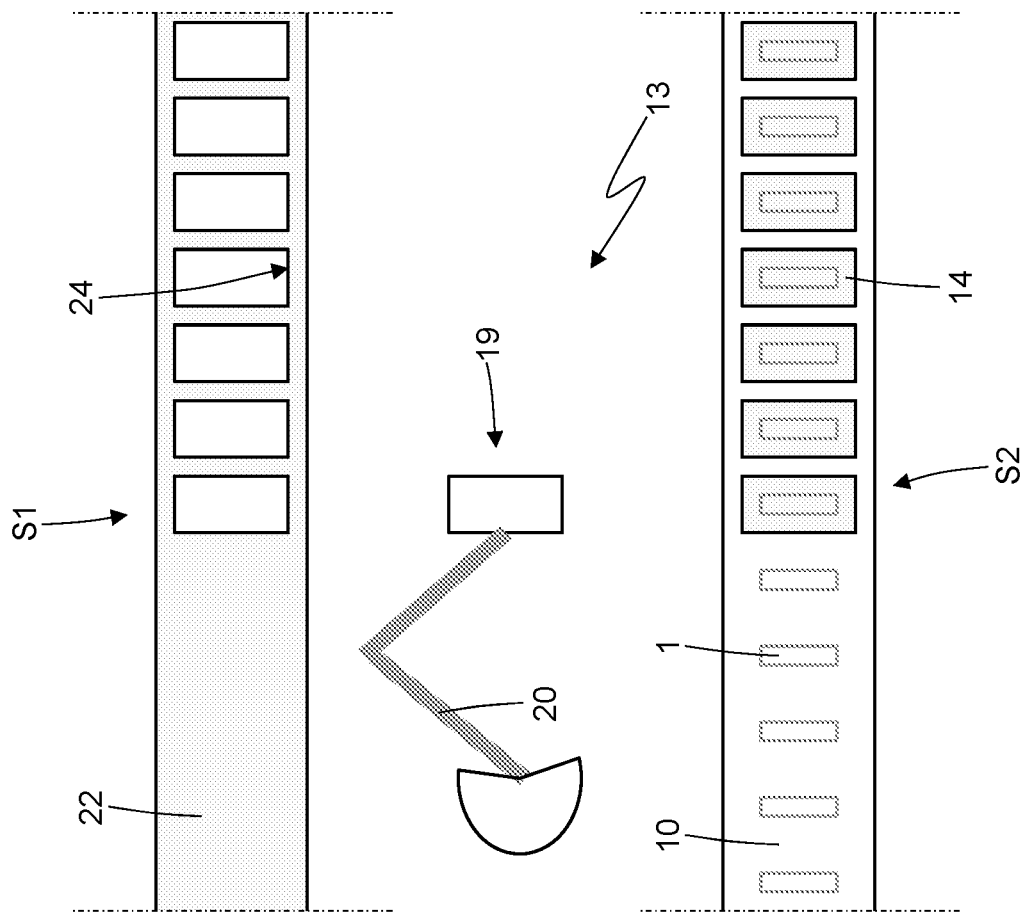

PROCESSING METHOD FOR INSERTING ELECTRONIC DEVICES THAT ARE SUITABLE FOR COMMUNICATING IN RADIO FREQUENCY INTO RESPECTIVE RUBBER SLEEVES

TECHNICAL SECTOR

The present invention relates to a processing method for inserting electronic devices that are suitable for communicating in radio frequency into respective rubber sleeves.

The present invention finds advantageous application in the insertion of transponders into respective rubber sleeves, to which the following description will make explicit reference without this implying any loss of generality.

PRIOR ART

In recent years, so-called "smart" pneumatic tires have emerged, which are capable of forming an active part of modern vehicles, supplying information concerning the type of pneumatic tires mounted, information concerning the status of the pneumatic tires and also information concerning environmental conditions.

A "smart" pneumatic tire is normally equipped with a transponder (that is, an electronic device suitable for communicating in radio frequency) which permits remote communication (that is, to both the vehicle whereupon the tire is mounted and to an operator who must carry out the checking or the replacement of the pneumatic tire) of the identification, the characteristics and the history of the pneumatic tire.

Recently, the unification has been proposed of RFID ("Radio-Frequency IDentification") technology, based upon the presence of transponders, and TPMS ("Tire Pressure Monitoring Systems") technology, which measures the effective inflation pressure in order to memorize within transponders the effective inflation pressure and then remotely communicate the effective inflation pressure by means of the transponders themselves.

Initially, it was proposed to glue a transponder onto the inner surface or onto the external surface of a sidewall of a pneumatic tire; this solution is extremely simple from a design perspective and is applicable also to existing pneumatic tires; however, by contrast, it does not guarantee that the transponder will not detach from the pneumatic tire (especially when it is glued to the external surface) following the cyclical deformations to which the sidewall of a pneumatic tire is subjected.

Thereafter, the integration of a transponder within the structure of a pneumatic tire was proposed, that is, within the interior of the various layers that make up the pneumatic tire.

In order to be able to integrate a transponder into the structure of a pneumatic tire, the transponder is generally inserted in advance into a rubber sleeve that completely surrounds the transponder on all sides; such a rubber sleeve has the function of both allowing the radio frequency signals to be emitted and received more efficiently, exploiting the dielectric properties of the rubber, and the function of protecting the transponder during the handling that is necessary in order to couple the transponder itself to the components that constitute the pneumatic tire.

In order to insert the transponder into respective rubber sleeves, it is known to advance a first rubber belt, which is arranged horizontally along a straight insertion path, to place the transponder onto an upper surface of the first rubber strip, to place a second rubber strip having the same dimensions as the first rubber belt over the upper surface of the first rubber belt (and therefore above the previously placed transponder), to press therebetween the two rubber belts by means of at least one pair of cooperating rollers, wherebetween the two rubber belts are passed, and then to transversely cut the two rubber belts in order to separate the rubber sleeve (which comprises a portion of the two rubber belts).

EP2172878 discloses a method for producing RFID tags.

US2011284155 discloses a method for fabricating at least one element comprising at least one electronic component that is covered in rubber, wherein the component is placed in contact with a first rubber strip and is covered by a second rubber strip in such a way as to cover the component.

DESCRIPTION OF THE INVENTION

The purpose of the present invention is to provide a processing method for inserting electronic devices that are suitable for communicating in radio frequency into respective rubber sleeves that are easy and inexpensive to manufacture.

According to the present invention, a processing method is provided for inserting electronic devices that are suitable for communicating in radio frequency into respective rubber sleeves, according to that which is set forth in the appended claims.

The claims describe preferred embodiments of the present invention forming an integral part of the present description.

BRIEF DESCRIPTION OF THE DRAWINGS

The present invention will now be described with reference to the attached drawings that show an exemplary, non-limiting embodiment, wherein:

FIGS. 2 and 3 are two views in cross section of the transponder of FIG. 1 according to the section line II-II and according to the section line III-III, respectively;

FIG. 4 is a schematic and side view of a processing unit that inserts transponders into respective rubber enclosures;

FIG. 5 is a schematic and plan view of the processing unit of FIG. 4;

FIG. 6 is a schematic and plan view of a device for feeding sheets of rubber of the processing unit of FIG. 4;

FIG. 7 is a schematic and side view of a gripping head of the feed device of FIG. 6 within a pickup station; and FIG. 8 is a schematic and side view of the gripping head of FIG. 7 within a transfer station.

PREFERRED EMBODIMENTS OF THE INVENTION

Figure 1:
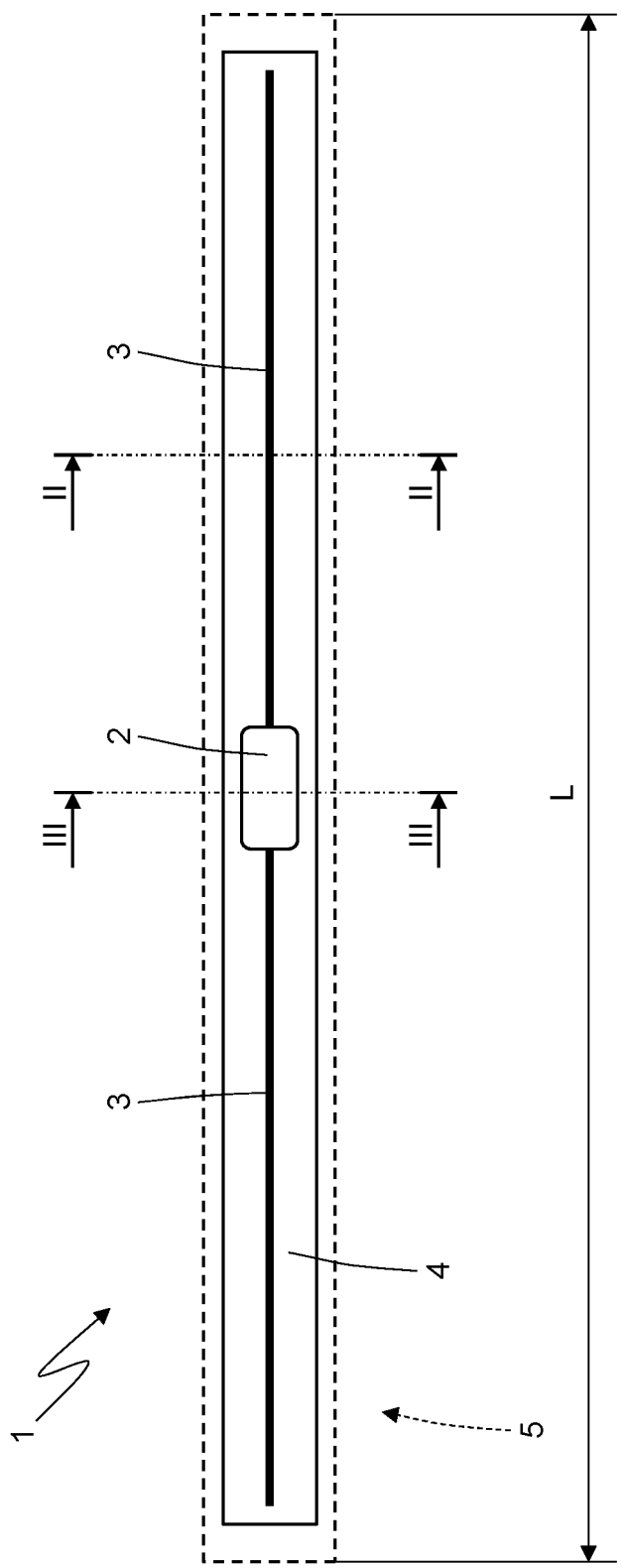
FIG. 1 is a schematic view of a transponder inserted into a rubber sleeve.

In FIG. 1, the numeral 1 denotes a transponder in its entirety, i.e., an electronic device (normally passive, i.e., without a dedicated power supply) that is capable of storing information and that is able to communicate by means of radio frequency. In other words, the transponder 1 is a "smart label" of small dimensions that is suitable for responding to remote polling by specific fixed or portable devices, called readers (or else polling devices); a reader is capable of reading and/or modifying the information contained within the transponder 1 that is polling whilst communicating with the transponder itself 1 in radio frequency. Accordingly, the transponder 1 is part of a wireless reading and/or writing system that operates according to so-called RFID technology ("Radio-Frequency IDentification").

The transponder 1 is intended to be integrated into a pneumatic tire, i.e., to be inserted between the components of the pneumatic tire during the construction of the pneumatic tire itself, or it is intended to be fixed onto an outer surface of the pneumatic tire 1.

According to that which is shown in FIG. 1, the transponder 1 comprises an electronic circuit 2 (i.e., a microchip) equipped with non-volatile memory (typically EEPROM or FRAM, the latter being more costly, but technologically more advanced), an antenna 3 connected to the electronic circuit 2, and a support 4 that carries both the electronic circuit 2 and the antenna 3 and that is frequently defined as a "substrate" (typically comprising a thin layer of mylar, plastic such as PET or PVC, or other similar materials); as said also below, the support 4 also could not be present. In the embodiment shown in FIG. 2, the antenna 3 is a dipole antenna (or simply a dipole) and comprises two equally open arms that are implemented using a linear electrical conductor whereupon the currents flow that remotely radiate the electromagnetic field.

In use, the antenna 3 receives an electromagnetic signal that, by electromagnetic induction, induces a difference in electrical potential within the antenna 3, which generates the circulation of an electrical current within the electronic circuit 2 in order to supply power to the electronic circuit 2 itself; the electronic circuit 2, thus activated, transmits the data contained within its memory by means of the antenna 3 and, where appropriate, also modifies the data contained within its memory.

According to that which is shown in FIGS. 1, 2 and 3, the transponder 1 is inserted into a rubber sleeve 5, comprising two strips 6 and 7 of green rubber superimposed and pressed one against the other (preferably, the rubber of the two rubber strips 6 and 7 is initially green and is vulcanized together with the rest of the pneumatic tire during the final vulcanization of the pneumatic tire itself); in general, the two strips 6 and 7 of green rubber of the sleeve 5 are 1-2 mm longer/wider than the transponder 1 (i.e., than the electronic circuit 2 and the antenna 3). The two strips 6 and 7 of green rubber are initially parallelepiped and deform around the components of the transponder 1 when they are pressed one against the other around the transponder 1 itself. According to an alternative embodiment, the two rubber strips 6 and 7 of the sleeve 5 are vulcanized from the beginning (i.e., the rubber of the two strips of rubber 6 is immediately vulcanized) or semi-vulcanized (or only partially vulcanized); the two rubber strips 6 and 7 could also have differing degrees of vulcanization therebetween (for example, the strip could be of green rubber whilst the strip 7 could be of vulcanized rubber or semi-vulcanized rubber or vice versa).

According to a different embodiment not shown, the support 4 is absent and its function is performed by the strips 6 and 7 of rubber of the sleeve 5.

According to a preferred (but clearly non-limiting) embodiment, the thickness T of the sleeve 5 (containing the transponder 1 within its interior) is between 0.6 and 2 mm, the width W of the sleeve 5 is approximately 8-12 mm, and the length L of the sleeve 5 is approximately 60-80 mm.

In FIGS. 4 and 5, the number 8 indicates a processing unit for inserting the transponder 1 into the corresponding rubber sleeves 5 in its entirety.

The processing unit 8 comprises a conveyor 9 that advances a single belt 10 of green rubber arranged (for example horizontally) along a horizontal and straight insertion path; as described below, the rubber belt 10 is intended to form the strip 6 of each sleeve 5. The green rubber belt 10 is fed to the conveyor 9 by means of a feed device 11 which could produce the green rubber belt 10 by means of an extruder or else it could unwind the green rubber belt 10 from a reel (whereupon the green rubber belt 10 is wound, for example by means of the interposition of a non-stick film that could be removed as the unwinding proceeds and that is generally reused after the eventual removal thereof).

The processing unit 8 includes a feed device 12 that places each transponder 1 upon an upper surface of the rubber belt 10 and (approximately) at the center of the rubber belt 10; necessarily, each transponder 1 is placed upon the upper surface of the rubber belt 10 in such a way as to stay within the confines of the rubber belt 10 itself. In the preferred embodiment shown in the accompanying figures, each transponder 1 is transversely placed upon the upper surface of the rubber belt 10, i.e., with a longitudinal axis of the transponder 1 perpendicular to a longitudinal axis 10 of the rubber belt 10; according to an alternative embodiment (not shown) each transponder 1 is longitudinally placed upon the upper surface of the rubber belt 10, i.e., with the longitudinal axis of the transponder 1 parallel (coaxial) to the longitudinal axis of the rubber belt 10.

For example, the feed device 12 could comprise a gripping head (suction or magnetic) that is suitable for picking up and holding a transponder 1 and a motorized arm that cyclically moves the gripping head between a pickup station, wherein the gripping head picks up a transponder 1, and a transfer station, wherein the gripping head places the transponder 1 upon the upper surface of the rubber belt 10. In other words, the gripping head of the feed device 12 can hold a transponder by means of pneumatic suction or else by means of the magnetic attraction generated by an electromagnet.

In the embodiment shown in the attached figures, the feed device 12 places upon the upper surface of the rubber belt 10 a single transponder 1 at a time; according to a different embodiment, not shown, the feed device 12 places upon the upper surface of the rubber belt 10 several transponders 1 at a time (for example two, three, four, five . . . transponders 1 at a time).

The processing unit 8 comprises a feed device 13 that is arranged downstream of the feed device 12 along the direction of travel of the rubber belt 10 and places upon the upper surface of the rubber belt 10, and above each previously placed transponder 1 a sheet of rubber 14 which completely covers the transponder 1; as described below, each sheet of rubber 14 is intended to form the strip 7 of each sleeve 5. In the embodiment shown in the accompanying figures, each sheet of rubber 14 has a rectangular shape, whilst, according to other embodiments not shown, each sheet of rubber 14 has a different shape than a rectangular shape. The sheet of rubber 14 may be composed of green rubber, semi-vulcanized rubber or of vulcanized rubber. In the embodiment shown in the accompanying figures, each sheet of rubber 14 covers a single transponder 1; according to a different embodiment, not shown, each sheet of rubber 14 covers several transponders 1 that are placed side by side (for example, two, three, four, five . . . transponders 1 side by side).

For example, the feed device 13 could comprise a gripping head that is suitable for picking up and holding a sheet of rubber 14 and a motorized arm that cyclically moves the gripping head between a pickup station, wherein the gripping head picks up a sheet of rubber 14, and a transfer station, wherein the suction gripping head places the sheet of rubber 14 upon the upper surface of the rubber belt 10 and upon a corresponding transponder 1.

In the embodiment shown in the attached figures, the feed device 13 places upon the upper surface of the rubber belt 10 a single sheet of rubber 14 at a time; according to a different embodiment not shown, the feed device 13 places upon the upper surface of the rubber belt 10 several sheets of rubber 14 at a time (for example two, three, four, five . . . sheets of rubber 14 at a time).

According to a preferred embodiment shown in the attached figures, the processing unit 8 comprises a compression device 15 that is arranged downstream of the feed device 13 along the direction of travel of the rubber belt 10 and that is suitable for pressing each sheet of rubber 14 against the rubber belt (with the interposition of the corresponding transponder 1).

According to a preferred embodiment shown in the attached figures, the compression device 15 comprises at least one pair of pressure rollers cooperating therebetween, wherein the rubber belt 10, carrying the transponders 1 that are covered with the sheets of rubber 14, is passed therebetween.

The processing unit 8 comprises a cutting device 16 that is arranged downstream of the compression device 15 along the direction of travel of the rubber belt 10 and that is suitable for cutting the rubber belt 10 in performing a perimeter cut of a rectangular shape around each transponder 1 in order to separate the sleeves 5 containing the respective transponders 1 from the rubber belt 10. The cutting device 16 comprises a cutting head 17 carrying a rectangular blade (that is clearly internally empty) and a counter head 18 that is aligned with the cutting head 17 and that is arranged on the other side of the rubber belt 10 in relation to the cutting head 17; the cutting head 17 is vertically movable, such as to approach and move away to/from the rubber belt 10 whilst the counter head 18 can be fixed, or else it can also be vertically movable, such as to approach and move away to/from the rubber belt 10.

In the embodiment shown in the attached figures, the cutting device 16 cuts out one transponder 1 at a time; according to a different embodiment, not shown, the cutting device 16 cuts out several transponders 1 at a time (for example two, three, four, five . . . transponders 1 at a time).

According to a preferred embodiment, the cutting device 16 cuts out both the rubber belt 10 and the sheets of rubber 14 such as to separate the sleeves 5 containing the respective transponders 1 from the rubber belt 10; in other words, the rectangular cut made by the cutting device 16 is (slightly) smaller than the sheets of rubber 14 in such a way that the rectangular cut made by the cutting device 16 also involves (crosses) the rubber sheets 14. That is, each perimeter cut of a rectangular shape made by the cutting device 16 is smaller than the corresponding sheet of rubber 14, is entirely contained within the corresponding sheet of rubber 14 and also passes over the corresponding sheet of rubber 14. As a result, the cutting device 16 cuts out each sleeve 5 from within a corresponding sheet of rubber 14.

It is important to emphasize that the conveyor 9 moves the rubber belt 10 according to an intermittent law of motion (i.e., step-by-step) that envisages a cyclic alternation of movement phases during which the rubber belt 10 is advanced, and stop phases during which the rubber belt 10 remains stationary. All of the processing (the feeding of the transponder 1, the feeding of the rubber sheets 14, the cutting out of the sleeves 5) is executed when the rubber belt 10 is stopped (or during the stop phases) and are suspended when the rubber belt 10 is in motion (i.e., during the movement phases).

In FIG. 6 a possible exemplary embodiment of the feed device 13 is shown that places upon the upper surface of the rubber belt 10 and upon each previously placed transponder 1 a sheet of green rubber 14. The feed device 13 comprises a gripping head 19 that is suitable for picking up and holding a sheet of rubber 14 and a motorized arm 20 that cyclically moves the gripping head 19 between a pickup station S1, wherein the gripping head 19 picks up a sheet of rubber 14, and a transfer station S2, wherein the gripping head 19 places the sheet of rubber 14 upon the upper surface of the rubber belt 10 and upon a corresponding transponder 1.

According to that which is shown in FIGS. 7 and 8, the gripping head 19 has a blade 21 of a rectangular shape and internally empty that is suitable for cutting and removing the sheets of rubber 14 from a rubber belt 22 that moves cyclically above a sliding plane 23 and that also acts as a counter to the blade 21; consequently, the portion of the rubber belt 22 that has already been used has a succession of rectangular openings 24 (shown in FIG. 6) at those areas wherefrom the sheets of rubber 14 were taken. The blade 21 may have a shape that is different than a rectangular shape: the blade 21 must reproduce the shape of the sheets of rubber 14 and, therefore, if the sheets of rubber 14 have a shape that is different (more or less) than a rectangular shape, then the blade 21 must also have the same shape (more or less) that is different from a rectangular shape. The gripping head 19 also has a pusher 25 that is arranged within the blade 21 of a rectangular shape and that is suitable for extracting a sheet of rubber 14 from within the blade 21 in order to place the sheet of rubber 14 upon the upper surface of the rubber belt 10 and upon a corresponding transponder 1. In this regard it is important to observe that the sheet of green rubber 14 is extremely "sticky" and therefore tends to firmly adhere to the inner surface of the blade 21 of a rectangular shape; accordingly, it is not necessary to provide means for retaining a sheet of rubber 14 within the blade 21 of a rectangular shape, and it is instead necessary to provide means (such as the pusher 25) for extracting a sheet of rubber 14 from within the blade 21 of a rectangular shape. Obviously, if the sheets of rubber 14 were made of vulcanized or semi-vulcanized rubber, then the blade 21 could be provided with means of retention (for example vacuum means) for retaining a sheet of rubber 14 therewithin.

In the embodiment shown in the attached figures, the rubber belt 22 wherefrom the sheets of rubber 14 are extracted is arranged laterally next to the rubber belt 10; according to a different embodiment, not shown, the rubber belt 22, wherefrom the sheets of rubber 14 are extracted, is arranged above the rubber belt 10 and aligned vertically with the rubber belt 10 itself (in this embodiment, the gripping head 19 only accomplishes a vertically straight linear movement).

The embodiments described herein can be combined with each other without departing from the scope of protection of the present invention.

The processing unit 8 described above has many advantages.

In the first place, the processing unit 8 described above is particularly simple and economical to implement insofar as it envisages the execution of only a few easily automated operations.

Furthermore, the insertion method described above makes it possible to insert a transponder 1 into the sleeve 5, whilst always ensuring high precision, insofar as each sheet of rubber 14 is placed upon the upper surface of the rubber belt 10 and upon a corresponding transponder 1 when the rubber belt 10 is stationary.

Finally, the insertion method described above makes it possible to reduce production costs compared to the solution of superimposing a further continuous rubber belt over the rubber belt 10, insofar as after the cut is made by the cutting device 16 the amount of rubber that is discarded is reduced; this is by virtue of the fact that the sheets of rubber 14 are smaller than the rubber belt 10 (i.e., they almost the size of the transponders 1).

The invention claimed is:

1. A method for inserting electronic devices that are suitable for communicating in radio frequency into respective rubber sleeves, each of which comprises two overlapping strips that enclose therebetween the corresponding electronic device, the method comprising:
   advancing a first rubber belt via a conveyor along a direction of travel, wherein the first rubber belt forms a first strip of each sleeve;
   placing the electronic devices upon an upper surface of the first rubber belt via a first feed device, wherein the first feed device comprises:
      a first gripping head that is suitable for picking up and holding an electronic device; and
      a motorized arm that cyclically moves the gripping head between a pickup station, wherein the gripping head picks up the electronic device, and a transfer station, wherein the gripping head places the electronic device upon the upper surface of the first rubber belt;
   placing, via a second feed device, upon the upper surface of the first rubber belt and upon each electronic device, a corresponding sheet of rubber that completely covers the electronic device, wherein each sheet of rubber forms a second strip of each sleeve; and
   cutting out, via a cutting device arranged downstream of the second feed device along the direction of travel of the first rubber belt, at least the first rubber belt in performing a perimeter cut around each electronic device in order to separate each sleeve containing a respective electronic device from the rubber belt.

2. The method of claim 1, wherein the first rubber belt is arranged horizontally along an insertion path.

3. The method of claim 1, wherein the cutting device cuts both the first rubber belt and the sheets of rubber to separate the sleeves containing the respective electronic devices from the first rubber belt.

4. The method of claim 1, wherein each perimeter cut made by the cutting device is smaller than the corresponding sheet of rubber, is entirely contained within the corresponding sheet of rubber, and also passes over the corresponding sheet of rubber.

5. The method of claim 1, wherein:
   the conveyor advances the rubber belt according to an intermittent motion law that provides for a cyclic alternation of motion phases during which the first rubber belt is advanced and stop phases during which the first rubber belt remains stationary; and
   the feeding of the sheets of rubber and the cutting of the first rubber belt are performed when the first rubber belt is stationary and are suspended when the first rubber belt is in motion.

6. The method of claim 1, wherein the cutting device comprises a cutting head that carries a first internally hollow blade and a counter head that is aligned with the cutting head and that is arranged on the other side of the first rubber belt in relation to the cutting head.

7. The method of claim 1, wherein the second feed device comprises:
   a second head that is suitable for picking up and holding at least one sheet of rubber; and
   a second motorized arm that cyclically moves the second gripping head between a pickup station, wherein the gripping head picks up the sheet of rubber, and a transfer station, wherein the gripping head places the sheet of rubber upon the upper surface of the first rubber belt and upon a corresponding electronic device.

8. The method of claim 7, wherein the second gripping head comprises:
   a second internally hollow blade that is suitable for cutting and picking the sheets of rubber from a second rubber belt; and
   a pusher that is arranged within the second blade and that is suitable for extracting a sheet of rubber from within the blade in order to place the sheet of rubber upon the upper surface of the first rubber belt and upon a corresponding electronic device.

9. The method of claim 8, wherein the second rubber belt wherefrom the sheets of rubber are extracted is arranged laterally next to the first rubber belt.

10. The method of claim 8, wherein the second rubber belt wherefrom the sheets of rubber are extracted is arranged above the first rubber belt and vertically aligned with the first rubber belt itself.

11. The method of claim 1, further comprising:
   pressing against one another the first rubber belt and each sheet of rubber via a compression device that is arranged between the second feed device and the cutting device.

12. The method of claim 11, wherein the compression device comprises a pair of pressure rollers cooperating therebetween, and wherein the first rubber belt carrying the electronic devices and covered with the sheets of rubber is passed therebetween.

13. The method of claim 1, wherein the electronic device is suitable for being integrated into a pneumatic tyre.

14. A system comprising:
   a conveyor configured to advance a first rubber belt along a direction of travel, wherein the first rubber belt forms a first strip for each of a plurality of rubber sleeves;
   a first feed device configured to place a respective electronic device which is configured for radio frequency communication upon an upper surface of the rubber belt corresponding to each of the plurality of rubber sleeves, wherein the first feed device comprises:
      a first gripping head that is suitable for picking up and holding at least one electronic device; and
      a first motorized arm that cyclically moves the first gripping head between a pickup station, wherein the first gripping head picks up an electronic device, and a transfer station, wherein the first gripping head places the electronic device upon the upper surface of the first rubber belt;
   a second feed device configured to place a sheet of rubber upon the upper surface of the rubber belt and covering each electronic device placed thereupon, wherein the second feed device comprises:
      a second gripping head that is suitable for picking up and holding at least one sheet of rubber; and
      a second motorized arm that cyclically moves the second gripping head between the pickup station, wherein the second gripping head picks up a sheet of rubber, and the transfer station, wherein the second gripping head places the sheet of rubber upon the upper surface of the first rubber belt and upon a corresponding electronic device;

a cutting device arranged downstream of the second feed device along the direction of travel of the first rubber belt and configured to cut out at least the first rubber belt in a perimeter cut around each of the plurality of electronic devices to define, for each of the plurality of electronic devices, a corresponding sleeve comprising overlapping first and second strips, said first strip formed from a portion of the first rubber belt and said second strip formed from a portion of the sheet of rubber.

15. The system of claim 14, wherein each perimeter cut made by the cutting device is smaller than the corresponding sheet of rubber, is entirely contained within the corresponding sheet of rubber, and also passes over the corresponding sheet of rubber.

16. The system of claim 14, wherein:
the conveyor is configured to advance the rubber belt according to an intermittent motion law that provides for a cyclic alternation of motion phases during which the first rubber belt is advanced and stop phases during which the first rubber belt remains stationary; and
the feeding of the sheets of rubber and the cutting of the first rubber belt are performed when the first rubber belt is stationary and are suspended when the first rubber belt is in motion.

17. The system of claim 14, wherein the second gripping head comprises:
a second internally hollow blade that is suitable for cutting and picking the sheets of rubber from a second rubber belt; and
a pusher that is arranged within the second blade and that is suitable for extracting a sheet of rubber from within the blade in order to place the sheet of rubber upon the upper surface of the first rubber belt and upon a corresponding electronic device.

18. The system of claim 14, further comprising:
a compression device that is arranged between the second feed device and the cutting device and configured to press the first rubber belt and each sheet of rubber against one another;
wherein the compression device comprises a pair of pressure rollers cooperating therebetween, and wherein the first rubber belt carrying the electronic devices and covered with the sheets of rubber is passed therebetween.

19. A method for inserting electronic devices that are suitable for communicating in radio frequency into respective rubber sleeves, each of which comprises two overlapping strips that enclose therebetween the corresponding electronic device, the method comprising:
advancing a first rubber belt via a conveyor along a direction of travel, wherein the first rubber belt forms a first strip of each sleeve;
placing the electronic devices upon an upper surface of the first rubber belt via a first feed device;
placing, via a second feed device, upon the upper surface of the first rubber belt and upon each electronic device, a corresponding sheet of rubber that completely covers the electronic device, wherein each sheet of rubber forms a second strip of each sleeve,
wherein the second feed device comprises:
a second head that is suitable for picking up and holding at least one sheet of rubber; and
a second motorized arm that cyclically moves the second gripping head between a pickup station, wherein the gripping head picks up a sheet of rubber, and a transfer station, wherein the gripping head places the sheet of rubber upon the upper surface of the first rubber belt and upon a corresponding electronic device; and
cutting out, via a cutting device arranged downstream of the second feed device along the direction of travel of the first rubber belt, at least the first rubber belt in performing a perimeter cut around each electronic device in order to separate each sleeve containing a respective electronic device from the rubber belt.

20. The method of claim 19, wherein the second gripping head comprises:
a second internally hollow blade that is suitable for cutting and picking the sheets of rubber from a second rubber belt; and
a pusher that is arranged within the second blade and that is suitable for extracting a sheet of rubber from within the blade in order to place the sheet of rubber upon the upper surface of the first rubber belt and upon a corresponding electronic device.

21. The method of claim 20, wherein the second rubber belt wherefrom the sheets of rubber are extracted is arranged laterally next to the first rubber belt.

22. The method of claim 20, wherein the second rubber belt wherefrom the sheets of rubber are extracted is arranged above the first rubber belt and vertically aligned with the first rubber belt itself.

* * * * *